(12) United States Patent
Batkin, III

(10) Patent No.: US 11,084,741 B2
(45) Date of Patent: *Aug. 10, 2021

(54) APPARATUS, SYSTEM AND METHOD FOR MAGNETIC FLUID TREATMENT

(71) Applicant: Fred A. Batkin, III, Visalia, CA (US)

(72) Inventor: Fred A. Batkin, III, Visalia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,367

(22) Filed: Dec. 11, 2020

(65) Prior Publication Data

US 2021/0094847 A1    Apr. 1, 2021

Related U.S. Application Data

(63) Continuation-in-part of application No. 15/799,035, filed on Oct. 31, 2017, now Pat. No. 10,894,728.

(Continued)

(51) Int. Cl.
*C02F 1/48* (2006.01)
*C02F 1/72* (2006.01)
(Continued)

(52) U.S. Cl.
CPC ............ *C02F 1/482* (2013.01); *B01F 3/0446* (2013.01); *B01F 5/0413* (2013.01); *C02F 1/727* (2013.01); *B01F 2215/0052* (2013.01); *C02F 2103/06* (2013.01); *C02F 2201/005* (2013.01); *C02F 2303/22* (2013.01)

(58) Field of Classification Search
CPC ...... C02F 1/482; C02F 1/727; C02F 2303/22; C02F 2201/005; C02F 2103/06; C02F 1/485; C02F 2103/32; C02F 2301/02; C02F 2201/48; C02F 2303/26; C02F 2201/002; B01F 3/0446; B01F 5/0413; B01F 2215/0052; B01F 3/04503; B03C 1/00; B03C 1/032; B03C 1/034; B03C 1/08; B03C 1/14; B03C 1/22; B03C 2201/22; B03C 1/02; B03C 1/031; B03C 1/284; B03C 1/0332; B03C 1/0335; B03C 1/286; B03C 2201/28; B03C 2201/18;
(Continued)

(56) References Cited

U.S. PATENT DOCUMENTS 2,149,764 A    3/1939  Frei
3,139,403 A    6/1964  Cramer et al.
(Continued)

FOREIGN PATENT DOCUMENTS

EP    1904237 B1    8/2013
JP    2001334270 A    12/2001
(Continued)

*Primary Examiner* — Nam X Nguyen
*Assistant Examiner* — Ekandra S. Miller-Cruz
(74) *Attorney, Agent, or Firm* — Hayes Soloway PC

(57) ABSTRACT

A magnetic fluid treatment system chamber for treating water for agricultural and other uses includes a fluid inlet and a fluid outlet opposite the fluid inlet. A fluid flow path runs from the fluid inlet to the fluid outlet. A plurality of ferrous metal rods is located circumferentially-spaced about the flow path. The ferrous metal rods are parallel to the flow path. A plurality of axially oriented magnets each has a north face and a south face. Each of the faces of the axially oriented magnets abuts one of the ferrous metal rods.

15 Claims, 4 Drawing Sheets

Related U.S. Application Data

(60) Provisional application No. 62/415,400, filed on Oct. 31, 2016.

(51) Int. Cl.
  B01F 3/04 (2006.01)
  B01F 5/04 (2006.01)
  C02F 103/06 (2006.01)

(58) Field of Classification Search
  CPC .......................... B01D 21/00; B01D 21/0009; B01D 46/0034; B01D 2201/4069; B01D 35/06
  USPC .............. 210/222, 223, 695, 167.03, 167.29; 209/38, 39, 40, 509, 562, 60, 9, 220, 209/223.1, 226, 230, 232, 368, 478
  See application file for complete search history.

(56) References Cited

U.S. PATENT DOCUMENTS

| | | | |
|---|---|---|---|
| 3,371,790 A | 3/1968 | Kudlaty et al. | |
| 3,680,705 A | 8/1972 | Happ et al. | |
| 4,288,323 A | 9/1981 | Brigante | |
| 4,505,815 A * | 3/1985 | Lindler | C02F 1/481 210/223 |
| 5,366,623 A | 11/1994 | Clair | |
| 5,622,622 A | 4/1997 | Johnson | |
| 5,667,074 A | 9/1997 | Reali et al. | |
| 5,728,303 A | 3/1998 | Johnson | |
| 5,766,461 A * | 6/1998 | Kampf | B01J 19/087 210/222 |
| 6,056,872 A | 5/2000 | Glass | |
| 6,299,768 B1 | 10/2001 | Okamoto | |
| 6,325,942 B1 | 12/2001 | Freije, III | |
| 6,706,178 B2 * | 3/2004 | Simonson | B01D 35/06 210/222 |
| 9,352,331 B1 | 5/2016 | Lee et al. | |
| 2002/0056679 A1 | 5/2002 | Sato | |
| 2003/0173264 A1 | 9/2003 | Yang | |
| 2004/0020835 A1 | 2/2004 | Chang | |
| 2007/0246430 A1 | 10/2007 | Chau | |
| 2012/0261349 A1 | 10/2012 | Kolstad et al. | |
| 2014/0263077 A1 | 9/2014 | Lombardi et al. | |

FOREIGN PATENT DOCUMENTS

| | | |
|---|---|---|
| JP | 2007275893 A | 10/2007 |
| KR | 101369013 B1 | 3/2014 |
| WO | 2007031984 A1 | 3/2007 |

* cited by examiner

APPARATUS, SYSTEM AND METHOD FOR MAGNETIC FLUID TREATMENT

CROSS REFERENCE TO RELATED APPLICATIONS

This application is a Continuation-In-Part of U.S. patent application Ser. No. 15/799,035 filed on Oct. 31, 2017, entitled "NOVEL DEVICE FOR TREATING WATER TO REDUCE THE SIZE OF THE WATER CLUSTERS, INCREASE DISSOLVED OXYGENATION LEVELS, PRODUCE FREE HYDROGEN ATOMS, PRODUCE", which claims the benefit of U.S. Provisional Patent Application No. 62/415,400 filed on Oct. 31, 2016 entitled "NOVEL DEVICE FOR TREATING WATER TO REDUCE THE SIZE OF THE WATER CLUSTERS, INCREASE DISSOLVED OXYGENATION LEVELS, PRODUCE FREE HYDROGEN ATOMS, PRODUCE". Each of these applications is herein incorporated by reference in its entirety.

FIELD

The present application relates to the field of fluid treatment. More specifically, the present application relates to the use of magnetic fields and water treatment to break water clusters.

BACKGROUND

Although water is chemically neutral, it is one of the best solvents known to man. Water has the capability to entrap other substances. In other words, it tends to cluster around non-water particles, forming conglomerations or complexes, as they are called scientifically.

The ability of water to entrap substances results in its high mineral content. The level of dissolved minerals carried by the water determines its hardness. One of the most common minerals in water is calcium carbonate, a substance that can be found in mountain ranges. When water evaporates, the dissolved minerals become over-concentrated and must crystallize. This also happens when the temperature of the water increases, or when the solubility of the carbonates in the water decreases. The crystallization produces a sediment of those minerals on the walls of water container or water conduit.

These sediments of minerals that grow on the container and conduit walls are limestone, which hardens and is difficult to remove. Very hard water can produce these hard sediments with bad consequences. Unfortunately, this process is a slow developing problem and is often not recognized and untreated until it causes a negative event. Nevertheless, the effects of hard water are quite noticeable if left to build up over time.

It only takes a few years for hard lime scale to take its toll on water pipes and equipment. Such sediment layers in heaters hinder the transfer of heat. In swimming pools, the removal of existing hard lime scale is usually accomplished by an acid wash, which interrupts the operation of the system. Furthermore, the same acid that breaks up the sediment layers can attack the pool lining and other produce other negative effects.

Magnetic treatment of water is not a new approach. These systems have been around the industry for over 40 years with limited success. Many of the systems, included systems from the United States, Canada, and Australia, would only be efficacious with certain water types when applied to irrigation practices. Therefore, a more effective magnetic water treatment system is needed.

SUMMARY

A magnetic fluid treatment system chamber for treating fluid for agricultural and other uses includes a fluid inlet and a fluid outlet opposite the fluid inlet. A fluid flow path runs from the fluid inlet to the fluid outlet. A plurality of ferrous metal rods is located circumferentially-spaced about the flow path. The ferrous metal rods are parallel to the flow path. A plurality of axially oriented magnets each has a north face and a south face. Each of the faces of the axially oriented magnets abuts one of the ferrous metal rods.

In one embodiment, the magnetic fluid treatment system chamber is part of a magnetic fluid treatment system that includes a first section and a second section of a base pipe connected inline. A first diversion opening is formed in the first section. A second diversion opening is formed in the second section. The magnetic fluid treatment system chamber is connected between the first diversion opening and the second diversion opening. A fluid diversion valve is connected between the first section and second section, whereby the fluid diversion valve controls an amount of fluid able to flow inline from the first second to the second section, which diverts fluid through the diversion openings.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

Similar reference characters denote corresponding features consistently throughout the attached drawings.

DETAILED DESCRIPTION

Figure 1:
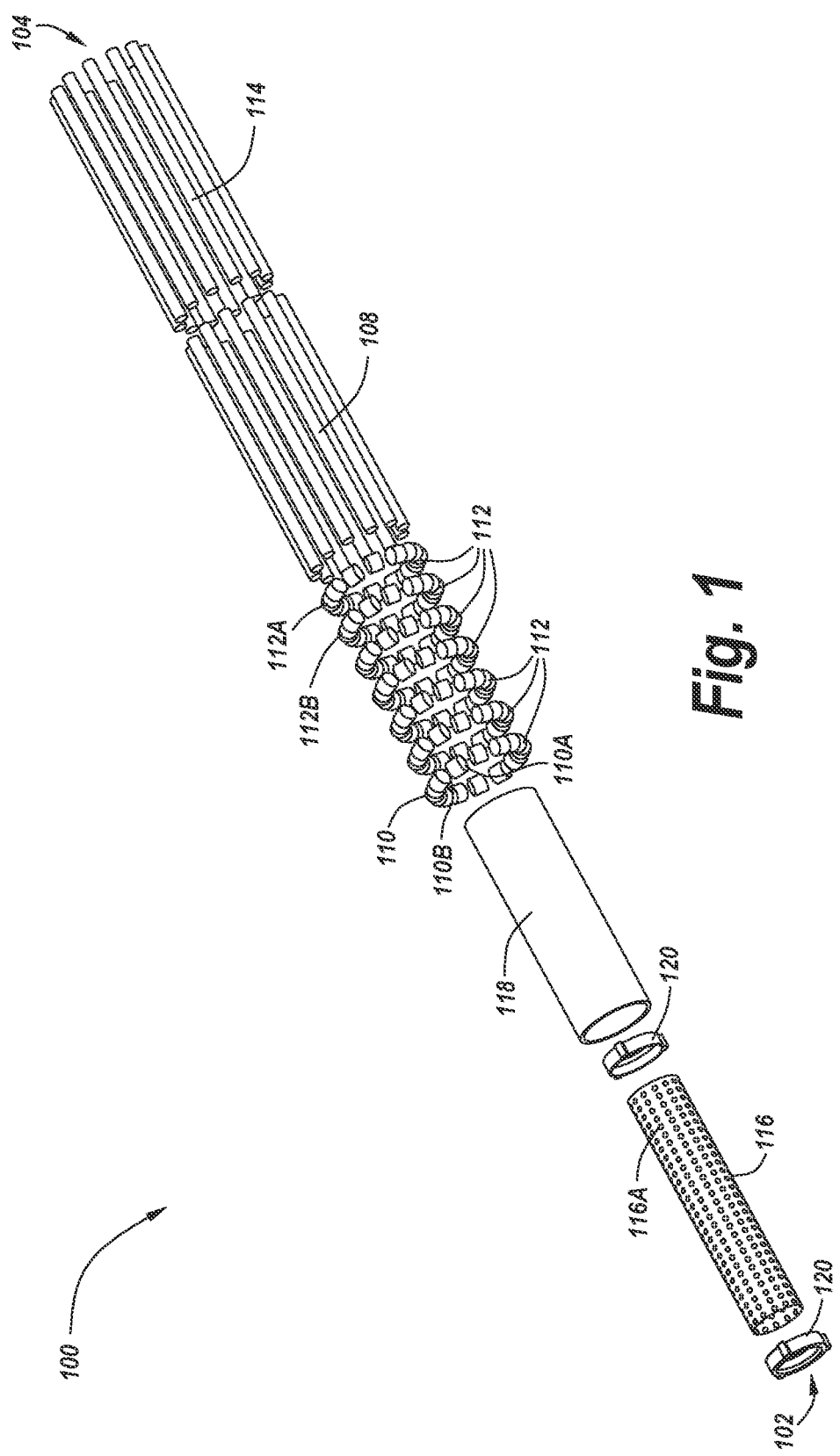
FIG. 1 is an illustration of an exploded perspective view of a magnetic fluid treatment system chamber, in accordance with a first exemplary embodiment of the technology disclosed herein.
Figure 2:
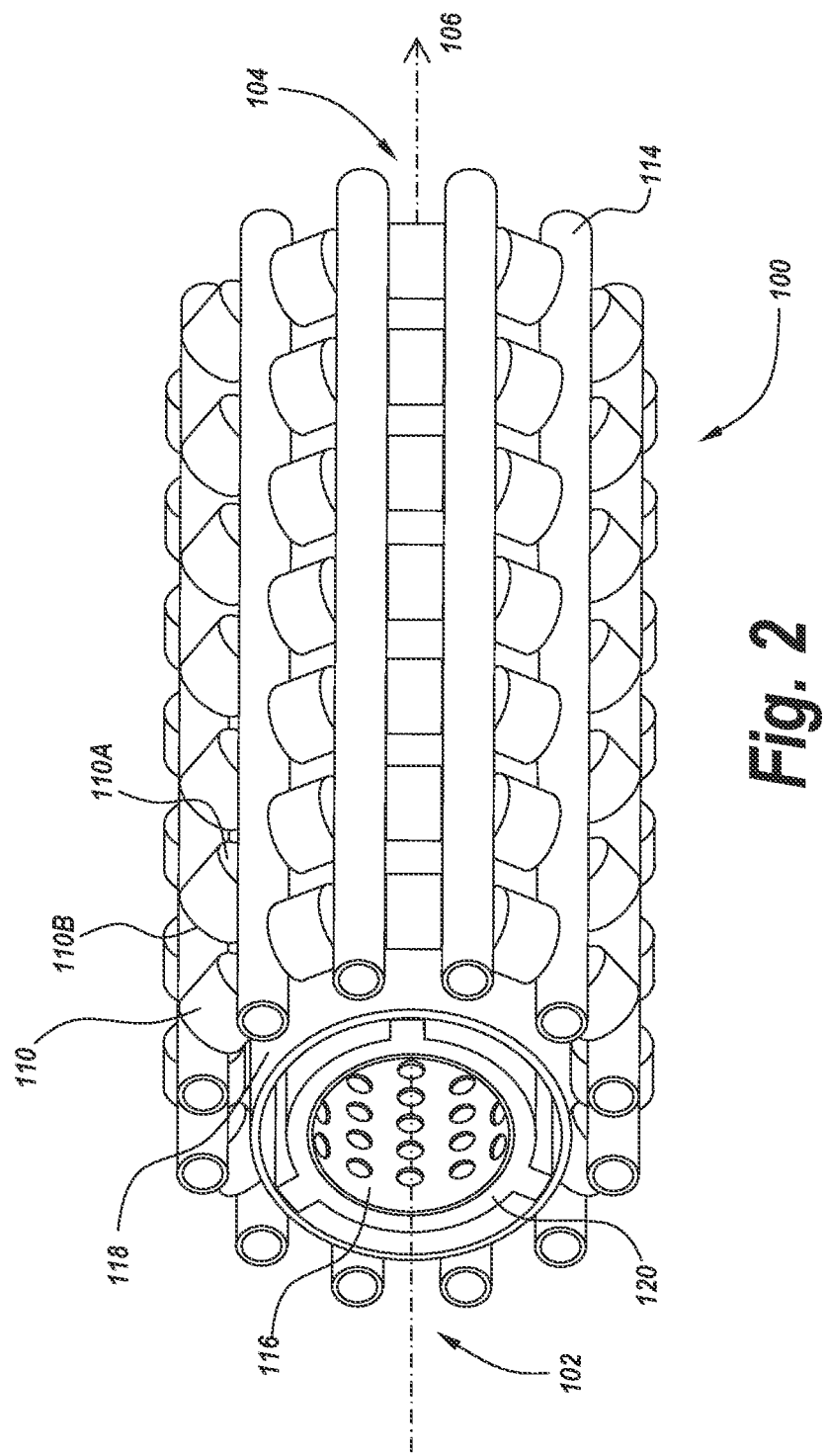
FIG. 2 is an illustration of a perspective view of the magnetic fluid treatment system chamber illustrated in FIG. 1, in accordance with the first exemplary embodiment of the technology disclosed herein.

FIG. 1 is an illustration of an exploded perspective view of a magnetic fluid treatment system chamber 100, in accordance with a first exemplary embodiment of the technology disclosed herein. FIG. 2 is an illustration of a perspective view of the magnetic fluid treatment system chamber 100 illustrated in FIG. 1. The magnetic fluid treatment system chamber 100 is developed for addressing water clusters, although nothing about the structure of the chamber 100 prevents the passage of other fluids. The magnetic fluid treatment system chamber 100 includes a fluid inlet 102 and a fluid outlet 104 opposite the fluid inlet. A fluid flow path 106 is formed from the fluid inlet 102 to the fluid outlet 104. The fluid flow path 106 is substantially linear with a straight conduit between the fluid flow inlet 102 and the fluid flow outlet 104, although contents of the magnetic fluid treatment system may agitate fluid within the fluid flow path 106 that creates nonlinear movement for some fluid.

A plurality of ferrous metal rods 108 are circumferentially spaced about the fluid flow path 106. The plurality of ferrous metal rods 108 are parallel to the fluid flow path 106. The ferrous metal rods 108 may be cold rolled steel, for example. The material of the ferrous metal rods 108 may be selected based on its conductivity of magnetic fields and durability in an aqueous environment.

A plurality of axially oriented magnets 110 each has a north face 110A and a south face 110B. The north face 110A and south face 110B of each axially oriented magnet 110 abuts one of the ferrous metal rods 108. Each of the axially oriented magnets 110 is positioned perpendicular to the abutting ferrous metal rods 108. The axially oriented magnets 110 may be neodymium magnets or other types of permanent magnets. The axially oriented magnets 110 should be commonly sized to allow similar spacing between the ferrous metal rods 108 while allowing each of the axially oriented magnets 110 to be sandwiched between the two nearest ferrous metal rods 108. The axially oriented magnets 110 may be held in place by magnetic attraction to the ferrous metal rods 108 or may be held in place by additional attachment structures as may be known to those having ordinary skill in the art, including adhesive or mechanical attachment.

The arrangement of the ferrous metal rods 108 and the axially oriented magnets 110 creates two magnetic influences on fluid passing along the fluid flow path 106. The flux lines generated from each of the axially oriented magnets 110 are essentially a series of circles, each passing through the north face 110A and south face 110B and a center of the axially oriented magnet 110. The axially oriented magnets 110 also generate magnetic fields emanating from the ferrous metal rods 108. The flux lines emanating from the ferrous metal rods 108 have an oval shape and pass perpendicular to the axis of the ferrous metal rods 108. The different shaped flux lines emanating from the ferrous metal rods 108 and the axially oriented magnets 110 combine to produce a polyphonic array of magnetic fields.

As illustrated in FIG. 1, the plurality of axially oriented magnets 110 may be arranged in multiple rings 112 including a first ring 112A and a second ring 112B. The first ring 112A may be parallel to the second ring 112B. The magnetic fluid treatment system chamber 100 may include any number of rings 112 of axially oriented magnets 110.

In FIG. 1 and FIG. 2, seven rings 112 are illustrated. The rings 112 may be arranged to have one axially oriented magnet 110 for every ferrous metal rod 108. For example, FIG. 1 illustrates twelve axially oriented magnets 110 in each ring 112 and twelve ferrous metal rods 108. However, each ring 112 may have fewer axially oriented magnets 110 than the number of ferrous metal rods 108. Each ring 112 may have one axially oriented magnet 110 for every two ferrous metal rods 108 by providing axially oriented magnets 110 between every other pair of ferrous metal rods 108.

This and other arrangements are considered to be within the scope of the present disclosure.

The ferrous metal rods 108 may include copper cladding 114. The copper cladding 114 helps to protect the ferrous metal rods 108 within an aqueous environment. Neither the ferrous metal rods 108, nor the copper cladding 114 are intended to carry an electrical current. The ferrous metal rods 108 and/or the copper cladding 114 may be grounded to avoid any errant conduction of current.

The magnetic fluid treatment system chamber 100 may include a perforated metal tube 116 positioned about the fluid flow path 106. The perforated metal tube 116 is encircled by the plurality of ferrous metal rods 108. The perforated metal tube 116 may have a cylindrical form with a collection of perforations 116A. The fluid is expected to flow both within and exterior to the cylindrical form as well as having fluid flowing through the perforations 116A. The perforated metal tube 116 is made of a material capable of enduring in an aqueous environment with minimal degradation as may be known to those having ordinary skill in the art. The perforated metal tube 116 helps to mechanically break clusters of fluid molecules.

The magnetic fluid treatment system chamber 100 may include a nonporous sleeve 118 positioned about the perforated metal tube 116. The fluid flow path 106 is within the nonporous sleeve 118. The nonporous sleeve 118, if utilized, shields the ferrous metal rods 108 and axially aligned magnets 110 from contact with the fluid, keeping the plurality of ferrous metal rods 108 and the plurality of axially oriented magnets 110 dry. Utilizing both the copper cladding 114 and the nonporous sleeve 118 may be redundant.

The magnetic fluid treatment system chamber 100 may include at least one collar 120 engaged at least partially between the nonporous sleeve 118 and the perforated tube 116. The collar 120 may help maintain a consistent gap between the nonporous sleeve 118 and the perforated tube 116. Within this construction of the magnetic fluid treatment system chamber 100, fluid is intended to flow between the nonporous sleeve 118 and the perforated tube 116. Either the perforated tube 116, the nonporous sleeve 118, or the collar 120 may be connected to piping before or after the magnetic fluid treatment system chamber 100 to integrate the magnetic fluid treatment system chamber 100 with the rest of the fluid piping.

Figure 3:
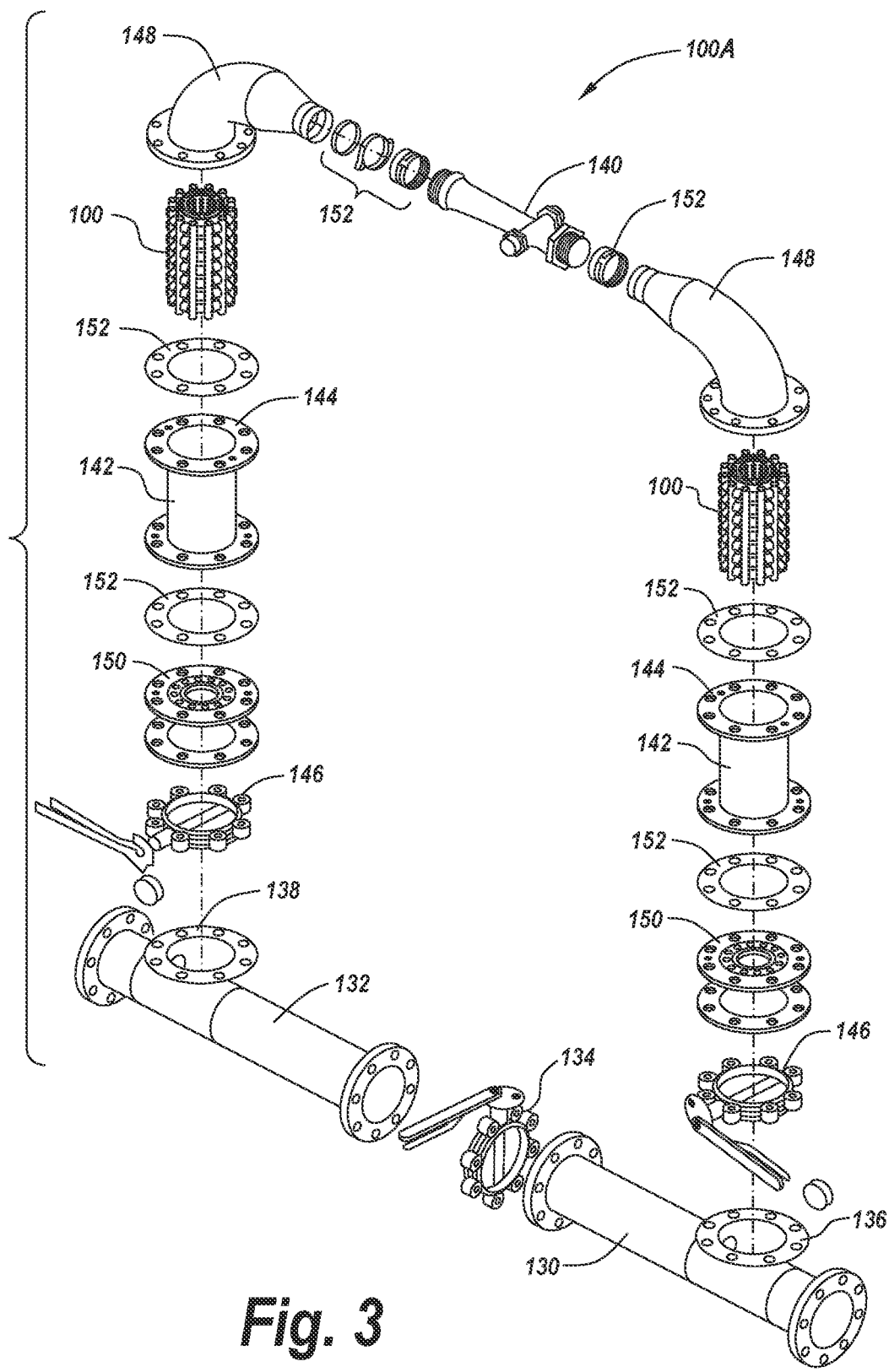
FIG. 3 is an illustration of an exploded perspective view of a magnetic fluid treatment system building from the magnetic fluid treatment system chamber illustrated in FIG. 1, in accordance with the first exemplary embodiment of the technology disclosed herein.
Figure 4:
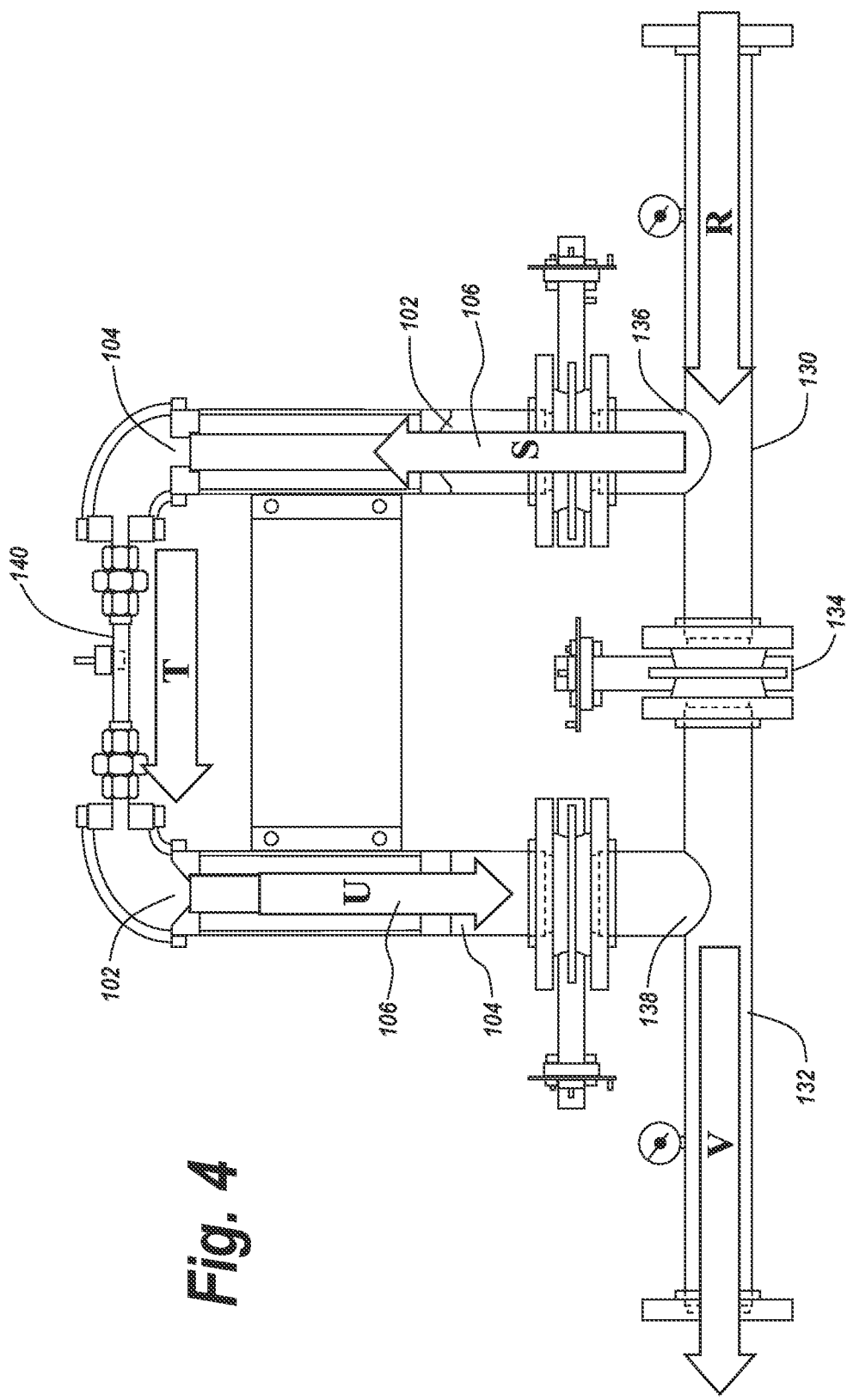
FIG. 4 is an illustration of a perspective view of the magnetic fluid treatment system illustrated in FIG. 3, in accordance with the first exemplary embodiment of the technology disclosed herein.

FIG. 3 is an illustration of an exploded perspective view of a magnetic fluid treatment system 100A building from the magnetic fluid treatment system chamber 100 illustrated in FIG. 1, in accordance with the first exemplary embodiment of the technology disclosed herein. FIG. 4 is an illustration of a perspective view of the magnetic fluid treatment system 100A illustrated in FIG. 3, in accordance with the first exemplary embodiment of the technology disclosed herein. The magnetic fluid treatment system 100A includes a first section 130 and a second section 132 of a base pipe connected to the first section 130. A fluid diversion valve 134 is connected between the first section 130 and second section 132.

A first diversion opening 136 is formed in the first section 130. The first diversion opening 136 is connected to the fluid inlet 102. A second diversion opening 138 is formed in the second section 132. The second diversion opening 138 is connected to the fluid outlet 104. The fluid diversion valve 134 can be adjusted to reduce fluid admitting aperture, forcing more fluid through the first diversion opening 136, as is known to those having ordinary skill in the art. The fluid diversion valve 134 can similarly be adjusted to increase a fluid admitting aperture to reduce the amount of fluid diverted through the first diversion opening 136. All of the fluid passed through the first diversion opening 136 is eventually passed through the second diversion opening 138.

The magnetic fluid treatment system 100A may include a venturi chamber 140 connected between the fluid outlet 104 and the second diversion opening 138. The magnetic fluid treatment system 100A uses the venturi chamber 140 to add any mixture of gases (not shown) to the fluid during the treatment process. For some applications, the use of atmospheric air provides a useful mix of gases and oxygen into the fluid. The venturi chamber can be adapted to insert pure gases such as oxygen, nitrogen or any other gas desired. For example, the treatment of leachate fluid from landfills works better with pure oxygen than with atmospheric oxygen. The magnetic fluid treatment system 100A can be equipped with commercially available venturis for natural insertion of the air, or in some preferred embodiments can be equipped with an injector that works with a forced air pump for rapid infusion of oxygen. The venturi chamber 140 may be of a type available through commercial vendors.

The range of gas to liquid ratio in the venturi chamber 140 will depend on the application to which the magnetic fluid treatment system 100A is being used. For example, in an application to increase the efficiency and lower cost in a reverse osmosis scenario, the venturi may be closed entirely without gas permitted into the system. In a fluid clean-up situation where there are substantial solids in the fluid, a compressor may be incorporated to raise the volume of introduced gases beyond that which a venturi of any size can accommodate. Use of a compressor may work, for example, in dairy lagoons, which have massive amounts of manure in the liquid. In an agricultural application, one may use the venturi to introduce atmospheric gasses into the fluid stream to not only increase the dissolved oxygen, but to also supplement the stream with the additional gasses useful to enhance plant growth. The size of the venturi may be dictated by the size of the magnetic fluid treatment system 100A and the amount of fluid passing through. The physical and chemical properties of the outflow can be monitored to optimize the different variables.

The magnetic fluid treatment system chamber 100 is connected between the first diversion opening 136 and the second diversion opening 138. FIG. 3 illustrates two magnetic fluid treatment system chambers 100 between the first diversion opening 136 and the second diversion opening 138, although the magnetic fluid treatment system 100A can be operated with more or fewer magnetic fluid treatment system chambers 100, as may be warranted by the purpose. Similarly, the venturi chamber 140 may be located upstream or downstream from the magnetic fluid treatment system chambers 100, or may be located between the magnetic fluid treatment system chambers 100, as illustrated in FIG. 3.

The magnetic fluid treatment system chamber 100 may include a frame 142 having multiple openings 144 to engage the plurality of ferrous metal rods 108. The frame 142 may engage with the nonporous sleeve 118 to maintain the position of the ferrous metal rods 108 relative to the nonporous sleeve 118.

As illustrated in FIG. 3, the magnetic fluid treatment system 100A may include a flow control valve 146 mounted to the first diversion opening 136 and/or the second diversion opening 138 to control the volume of fluid passing through the first diversion opening and/or control the direction of fluid flow through the magnetic fluid treatment system chamber 100.

As illustrated in FIG. 3, the magnetic fluid treatment system 100A may include elbows 148 and fluid flow reducers 150 to manage and direct the fluid flow. The fluid flow reducers 150 may help control the fluid pressure within the venturi chamber 140 and the magnetic fluid treatment system chambers 100. The elbows 148 allow the fluid to be returned to the base pipe. While the venturi chamber 140 is illustrated between the elbows 148 and the magnetic fluid treatment system chambers 100 are illustrated between the elbows 148 and the base pipe, other configurations can be adopted without departing from the scope of the present disclosure.

As illustrated in FIG. 3, the magnetic fluid treatment system 100A may include various other fittings 152 used to connect the elements. Some fittings 152 are illustrated, but those having ordinary skill in the art will recognize there are various ways to interconnect the elements that form the magnetic fluid treatment system 100A without departing from the scope of the disclosure.

Each individual magnet creates its own series of lines of force thus multiplying the array by the number of individual magnets plus the steel rods. The purpose is to assure that the fluid crosses a perpendicular force line as it passes through the chamber. An in-depth review of the published literature plus a private review of unpublished notes from Nicholas Tesla indicates that the fluid should past through perpendicular lines to maximize the impact and adequately treat the fluid. The action maximizes the ionization process to breakdown the fluid clusters which allows the fluid to more readily accept dissolved oxygen. It is this polyphonic exposure process that assures a consistent result of fluid treatment and reduces the variability of treatment to various fluid conditions. Several years of laboratory testing have confirmed that the magnet configuration works on multiple fluid sources including well fluid, natural lake and river fluid and contaminated fluid from waste fluid lagoons and treatment ponds.

As illustrated in FIG. 4, the magnetic fluid treatment system 100A is designed to treat a portion of a stream of fluid R flowing through a base pipe by diverting it from the main line through the magnetic fluid treatment system 100A. Three valves, the fluid diversion valve 134 and the two flow control valves 146, control the amount of fluid diverted and the pressures in the magnetic fluid treatment system 100A. In the embodiment illustrated in FIG. 4, the fluid is treated in three separate stages as it flows through the magnetic fluid treatment system 100A and is ultimately returned to the base pipe.

A portion of fluid R is diverted through the first diversion opening 136, along flow path S, while the remaining portion of the fluid R continues through the fluid diversion valve 134. The diverted stream S first enters a first of the magnetic fluid treatment chambers 100. In this stage, the stream is compressed through a first of the fluid flow reducers 150 to compensate for a pressure differential between the first diversion opening 136 and the venturi chamber 140. The compression allows improved exposure of the fluid molecules to the magnetic lines of force within the magnetic fluid treatment chamber 100, where the process of breaking down the fluid clusters to smaller units begins. As the fluid passes through the magnetic field, an electrical current is generated and the process of electrolysis begins to break the hydrogen and oxygen bonds. The fluid also passes around and through the perforated metal tube 116, further breaking down the clusters.

Stream S continues beyond the magnetic fluid treatment chamber 100 and the first of the elbows 148 to become stream T within the venturi chamber 140. The magnetic fluid treatment system 100A uses the venturi chamber 140 to add any mixture of gases to the stream T during the treatment process. For most applications, the use of atmospheric air provides a productive mix of gases and oxygen into the fluid. The magnetic fluid treatment system 100A can be adapted to insert pure gases such as oxygen, nitrogen or any other gas the application requires. For example, experimentation suggests the treatment of leachate fluid from landfills works better with pure oxygen than with atmospheric oxygen. The magnetic fluid treatment system 100A can be equipped with commercially available venturis for natural insertion of the air, or in some preferred embodiments can be equipped with an injector that works with a forced air pump for rapid infusion of oxygen. The venturi is a commercially available product and the incorporation of a venturi in a fluid conduit system is known to those having ordinary skill in the art.

The range of gas to liquid ratio in the venturi chamber 140 will depend on the fluid being treated by the magnetic fluid treatment system 100A and the desired outcome. For example, in an application to increase the efficiency and lower cost in a reverse osmosis scenario, the venturi may be closed entirely without gas permitted into the system. On the other hand, in a fluid clean-up situation where there are substantial solids in the fluid, a compressor may be incorporated to raise the volume of introduced gases beyond that which a venturi of any size can normally accommodate. For example, the compressor may work in dairy lagoons, which have massive amounts of manure in the liquid. In an agricultural application, one may use the venturi chamber 140 to introduce atmospheric gasses into the fluid stream to not only increase the dissolved oxygen, but also to supplement the stream T with the additional gasses necessary to enhance plant growth. The size of the venturi chamber 140 is dictated by the size of the magnetic fluid treatment system 100A and the amount of fluid passing through. The physical and chemical properties of the outflow can be monitored to optimize the different variables.

Stream T continues beyond the venturi chamber 140 and the second of the elbows 148 to become stream U within a second magnetic fluid treatment chamber 100. The second magnetic fluid treatment chamber 100 includes several design features to facilitate the breaking down of the fluid clusters and the uptake of oxygen. The perforated metal tube 116 is positioned in the center of the second magnetic fluid treatment chamber 100 to allow fluid to flow under pressure on both sides of the perforated metal tube 116. The purpose of the perforated metal tube 116 is to mechanically break up the fluid molecules along with the effect of the magnetic fields. The result is additional hydrogen molecules being freed from the $H_2O$ bonds resulting in the production of free hydrogen. The free hydrogen then can combine with $H_2O$ molecules to form $H_2O_2$, hydrogen-peroxide, which is helpful in cleaning scaling from fluid systems. The combination of the injected oxygen from the venturi chamber 140, the polyphonic magnetic fields, and the perforated metal tube 116 result in the creation of nanobubbles which entrap the gases introduces in the venturi chamber 140. Nanobubbles are significant because they are less buoyant than normal bubbles due to the relatively small amount of gas that can be contained. The nanobubbles have a coefficient of friction that approaches the force of their buoyancy, resulting in the gases being retained in the fluid much longer than would be the case without them. It is this phenomenon that results in fluid treated by magnetic fluid treatment system 100A to be able to carry significantly more oxygen to its destination and to maintain levels of dissolved oxygen for a greatly extended period.

Upon exiting the second magnetic fluid treatment chamber 100, the treated fluid U is reinserted into the primary distribution line through the second diversion opening 138, combining with the fluid flowing through the fluid diversion valve 134 to form stream V and flow to its intended application.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

The invention claimed is:

1. A magnetic fluid treatment system chamber comprising:
    a fluid inlet;
    a fluid outlet opposite the fluid inlet;
    a fluid flow path from the fluid inlet to the fluid outlet;
    a plurality of ferrous metal rods circumferentially spaced about the fluid flow path, wherein the plurality of ferrous metal rods are parallel to the fluid flow path; and
    a plurality of axially oriented magnets, each of the plurality of axially oriented magnets having a north face and a south face, wherein each of the faces abuts one of the ferrous metal rods.

2. The magnetic fluid treatment system chamber of claim 1, further comprising:
    a first ring formed by a first subset of the plurality of axially oriented magnets;
    a second ring formed by a second subset of the plurality of axially oriented magnets, wherein the first ring is parallel with the second ring.

3. The magnetic fluid treatment system chamber of claim 1, further comprising copper cladding on the ferrous metal rods.

4. The magnetic fluid treatment system chamber of claim 1, further comprising a perforated metal tube positioned about the fluid flow path, wherein the perforated metal tube is encircled by the plurality of ferrous metal rods.

5. The magnetic fluid treatment system chamber of claim 4, further comprising a nonporous sleeve positioned about the perforated metal tube, wherein the fluid flow path is within the nonporous sleeve, whereby the nonporous sleeve keeps the plurality of ferrous metal rods and the plurality of axially oriented magnets dry.

6. The magnetic fluid treatment system chamber of claim 5, further comprising at least one collar engaged at least partially between the nonporous sleeve and the perforated metal tube thereby maintaining a consistent gap between the nonporous sleeve and the perforated metal tube.

7. The magnetic fluid treatment system chamber of claim 1, further comprising a nonporous sleeve positioned about the fluid flow path, wherein the nonporous sleeve is encircled by the plurality of ferrous metal rods.

8. The magnetic fluid treatment system chamber of claim 7, wherein the nonporous sleeve further comprises a frame having multiple openings to engage the plurality of ferrous metal rods.

9. The magnetic fluid treatment system chamber of claim 1, further comprising a first set of magnetic lines of flux emanating from the plurality of axially oriented magnets and a second set of magnetic lines of flux emanating from the plurality of ferrous metal rods, wherein the first set of magnetic lines of flux are perpendicular to the second set of magnetic lines of flux.

10. A magnetic fluid treatment system comprising the magnetic fluid treatment system chamber of claim 1, further comprising:
   a first section of a base pipe;
   a second section of a base pipe connected to the first section;
   a fluid diversion valve connected between the first section and second section;
   a first diversion opening formed in the first section, the first diversion opening connected to the fluid inlet; and
   a second diversion opening formed in the second section, the second diversion opening connected to the fluid outlet.

11. The magnetic fluid treatment system of claim 10, further comprising a venturi chamber connected between the fluid outlet and the second diversion opening.

12. A magnetic fluid treatment system comprising the magnetic fluid treatment system chamber of claim 1, further comprising:
   a first section of a base pipe;
   a second section of a base pipe connected to the first section;
   a first diversion opening formed in the first section;
   a second diversion opening formed in the second section, wherein the magnetic fluid treatment system chamber is connected between the first diversion opening and the second diversion opening; and
   a fluid diversion valve connected between the first section and second section, whereby the fluid diversion valve controls an amount of fluid able to flow directly from the first section to the second section, which diverts fluid through the diversion openings.

13. The magnetic fluid treatment system of claim 12, further comprising:
   a venturi chamber;
   the magnetic fluid treatment system chamber is connected between the first diversion opening and the venturi chamber; and
   a second magnetic fluid treatment system chamber is connected between the second diversion opening and the venturi chamber.

14. The magnetic fluid treatment system chamber of claim 1, wherein said axially oriented magnets are arranged to provide a polyphonic array of magnetic lines of force.

15. The magnetic fluid treatment system chamber of claim 1, further comprising a venturi chamber for adding gases to a fluid between the fluid inlet and the fluid outlet.

* * * * *